A further object is to provide variable speed
UNITED STATES PATENT OFFICE.

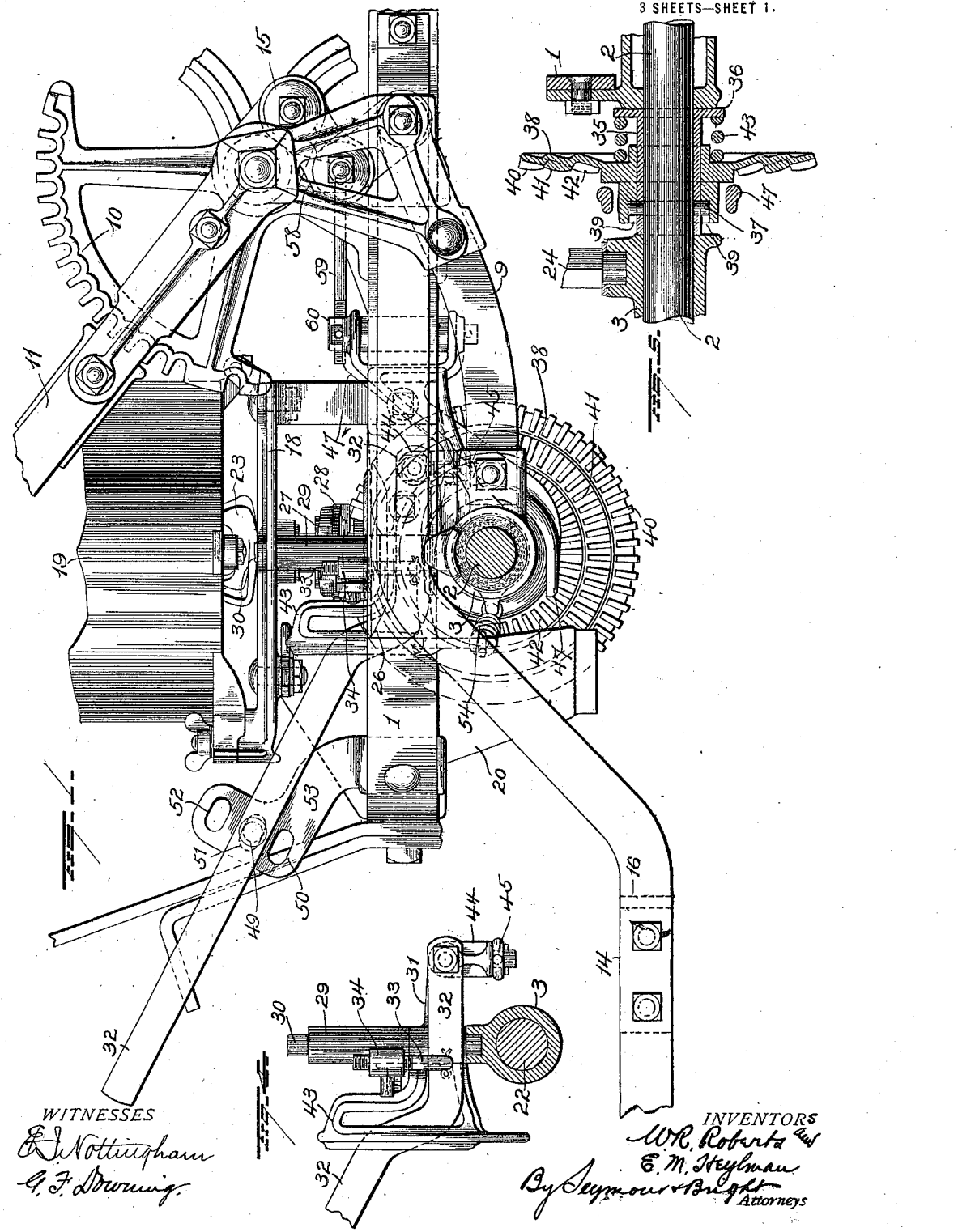

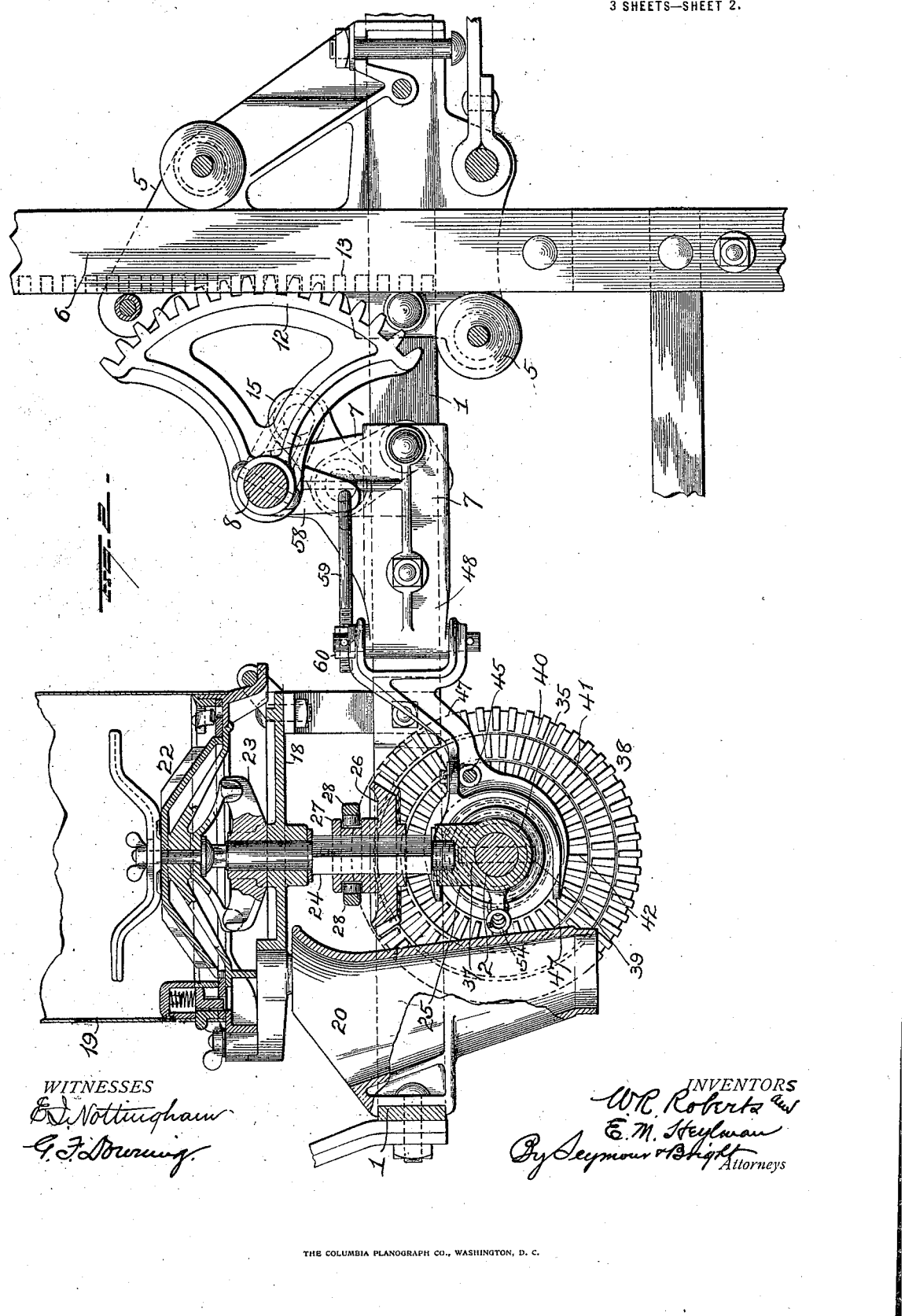

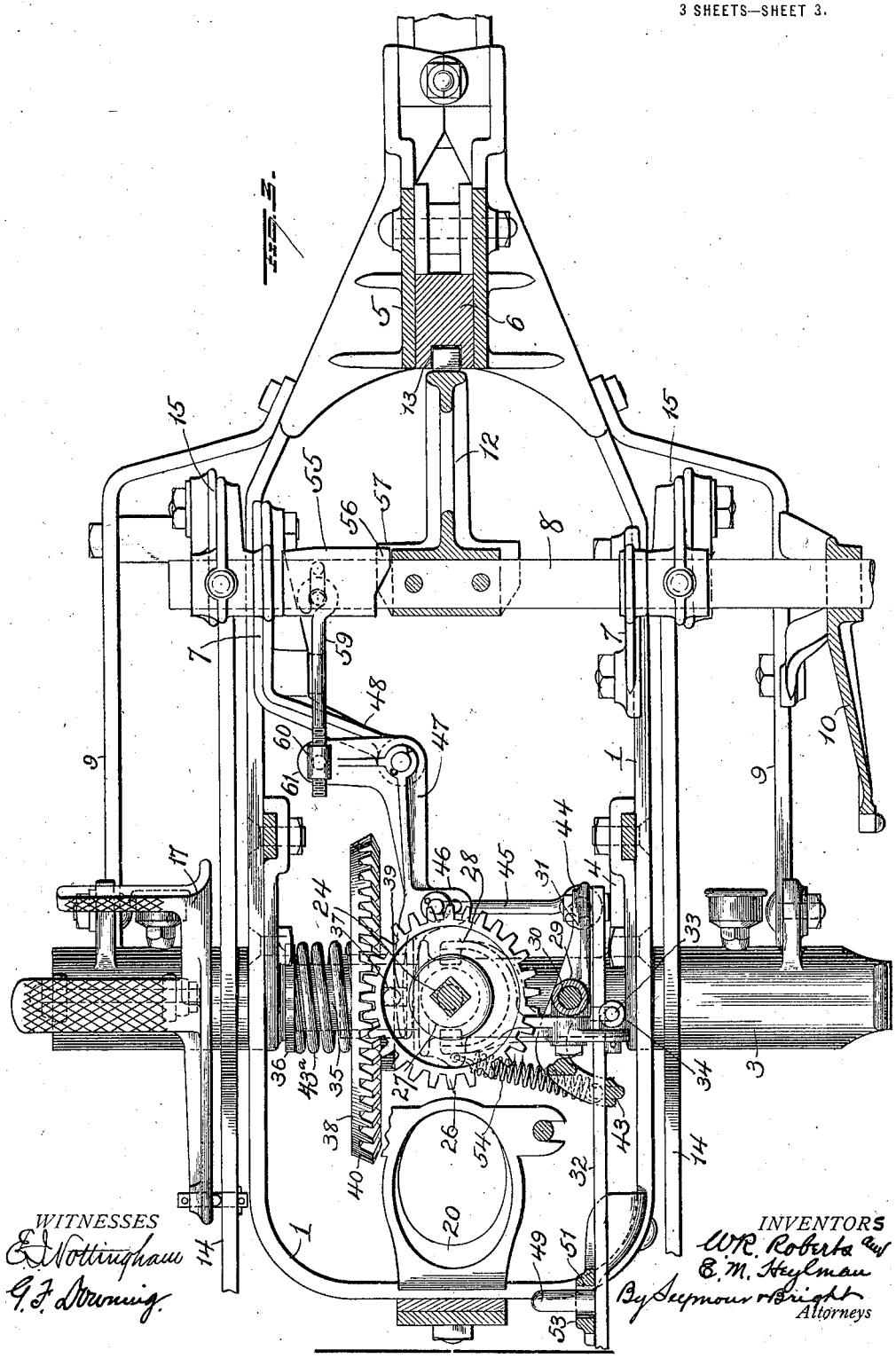

WILLIAM R. ROBERTS, OF DALLAS, TEXAS, AND EDWARD M. HEYLMAN, OF SOUTH BEND, INDIANA, ASSIGNORS TO OLIVER CHILLED PLOW WORKS, OF SOUTH BEND, INDIANA.

GEARING FOR THE FEED MECHANISM OF PLANTERS.

1,311,010.   Specification of Letters Patent.   Patented July 22, 1919.

Application filed June 20, 1918. Serial No. 240,986.

*To all whom it may concern:*

Be it known that we, WILLIAM R. ROBERTS, a citizen of the United States, and a resident of Dallas, in the county of Dallas and State of Texas, and EDWARD M. HEYLMAN, a citizen of the United States, and a resident of South Bend, in the county of St. Joseph, and State of Indiana, have invented certain new and useful Improvements in Gearing for the Feed Mechanism of Planters; and we do hereby declare the following to be a full, clear, and exact description of the invention, such as will enable others skilled in the art to which it appertains to make and use the same.

This invention relates to improvements in gearing for the feed mechanism of planters.

For a number of years there has been a tendency among cotton growers to reduce the amount of cotton seed planted, due to the increase in cost of such seed. Formerly, when cotton seed was more plentiful and comparatively cheap, the farmers were indifferent as to the quantity of seed which they planted, their chief consideration in this regard being the trouble which the work of thinning out would involve when an excessive quantity of seed would be planted. With the type of dropping mechanism formerly in use, the feed mechanism would "bunch" the seed and at times would "skip", so that in order to obtain anything like a good "stand", the farmers would plant the seed very thick and afterward chop out and leave bunches of plants from ten to twelve inches apart, and finally "thin down" to one plant. This required a great amount of labor and time, but since the "one seed" drop has come into use, much time, labor and seed have been saved.

One object of our invention is to provide simple and efficient means under the control of the operator whereby the dropping of seed singly can be regulated as conditions may require and thus greatly economize in the planting of the seed and in the subsequent cultivating of the plants.

A further object is to provide simple means for varying the amount of seed planted according to varying conditions of the soil and to so construct such means that they can be quickly operated while the planter is in motion, without subjecting any of the mechanism to undue strain or injury. A further object is to provide variable speed mechanism for operating the feed devices so that the speed of the feed plate can be quickly changed to increase or decrease the quantity of seed planted, according to the condition of fertility of the soil in different parts of the area over which the planter may be operating.

A further object is to so construct and arrange the variable speed mechanism and its controlling means, that the same may be operated without danger to the gears in shifting from one speed to another and so that the operator will be compelled to throw the gearing entirely out of operation before shifting from one speed to another; so that at least two movements of the control lever shall be necessary to bring about such results, and so that the same control lever may be employed to throw the machine out of gear as is used to shift the variable speed gearing.

With these and other objects in view, the invention consists in certain novel features of construction and combinations of parts as hereinafter set forth and pointed out in the claims.

In the accompanying drawings; Figure 1 is a view in side elevation (partly in section and partly broken away) of a portion of a planter, showing the application of our improvements; Fig. 2 is a sectional view partly in elevation; Fig. 3 is a plan view, partly in section, and Figs. 4 and 5 are detail views.

1 represents the main frame of the planter, and 2 the axle, the journals of the latter being mounted in the hubs of carrying wheels, not shown. The intermediate portion of the axle is mounted in a sleeve 3 disposed transversely under the main frame and secured to the latter by means of an arm 4.

A bracket 5 is located upon the forward portion of the main frame and through this bracket, a standard 6 for the forward furrow opener (not shown) is movable.

Brackets 7 project upwardly from the respective side members of the main frame and provide bearings for a transverse shaft 8. Side brackets or braces 9 are secured to the side members of the main frame and to the bearing sleeve 3 and to one of these brackets or braces, the frame of a toothed segment 10 is secured. The transverse shaft 8 passes through this segment frame and has secured thereto, a hand lever 11 provided with a detent to engage the toothed segment. A segmental gear 12 is secured to the shaft 8 and meshes with a rack bar 13 carried by the movable standard 6 for raising or lowering the latter to raise or lower the front furrow opener. The covering shovels (not shown) are to be located at the rear ends of bars 14,—the front ends of the latter being connected with the frame and suitable link mechanism indicated at 15 between the transverse shaft 8 and said coverer bars serve to impart movement to the latter for raising or lowering the covering shovels, when the lever 11 is operated. If desired, the coverer bars may be connected together by a cross bar indicated in dotted lines at 16 Fig. 1, and a foot lever 17 may be provided for raising the connected bars.

A horizontal frame 18 is supported by the main frame so as to be disposed somewhat above the latter and constitutes a supporting platform for a seed box 19,—and a seed chute 20 is secured to said frame 18 and to the rear end of the main frame for conveying grain from the seed box to the planting chute, not shown.

Seed dropping mechanism 22 is located in the bottom of the seed box and in the present instance this mechanism is of the one-seed-drop type, adapted for dropping cotton seed, one at a time. The particular feed or drop mechanism shown in the drawing may be removed, if desired, and a feed or drop mechanism for corn, milo maize, Kaffir corn or other varieties of small seed, substituted therefor.

The feeding or dropping mechanism is operated by a cross-head 23 carried by a vertical shaft 24, one end of which latter is mounted in the platform frame 18 and its lower end is mounted in an enlargement 25 on the sleeve 3. The intermediate portion of the shaft 24 may be angular in cross section and a pinion 26 is mounted to slide thereon. The pinion 26 is provided with a grooved collar 27 to receive the pins of a spanner lever 28, the latter being pivotally attached between its ends to a sleeve 29 located loosely on a vertical shaft 30 mounted at its lower end in a bearing on the axle sleeve 3 and at its upper end in the platform frame 18. An arm 31 mounted on the shaft 30 projects forwardly therefrom and to the free end of this arm, one end of a hand lever 32 is pivotally attached. A link 33 is pivotally connected at one end with the hand lever 32 and the other end portion of this link is threaded and passes through a threaded sleeve 34 pivoted to the short arm of the spanner lever 28. By moving the hand lever 32 on its pivotal connection with the arm 31, the pinion 26 will be shifted vertically on the shaft 24, for a purpose hereinafter explained.

A sleeve or bushing 35 having an annular flange 36 at one end, is mounted on the axle 2 and is secured thereto by means of a pin or key 37, as shown in Fig. 5, said sleeve engaging the framework and preventing endwise movement of the axle relatively to the frame. A disk gear 38 having a plurality of annular sets of gear teeth is mounted to slide on the sleeve or bushing 35 and caused to rotate therewith by the pin or key 37, the ends of which latter enter grooves 39 in the hub of said gear. The disk gear 38 is provided on one face with a plurality of annular series of gear teeth (three such series of teeth being shown), thus forming three concentric gears 40, 41 and 42 of relatively different diameters, and this plural gear is normally pressed toward and into mesh with the pinion 26 by means of a spring 43ª encircling the sleeve 35 and bearing at one end against the flange 36 of the latter and at the other end against the plural disk gear 38. By thus mounting the plural disk gear, the same can be rotated with the axle without subjecting the ends of the spring to frictional wear.

The forwardly projecting arm 31 mounted on the shaft 30, constitutes one member of a lever, the other member of which is made in the form of a loop 43 projecting rearwardly from the mounting of the arm 31 on the shaft 30, and through this lever loop, the hand lever 32 passes. The arm 31 is provided at its free end with a depending finger 44, with which one end of a rod 45 is connected and the other end of this rod is adjustably connected with a slotted arm 46 on a spanner lever 57. This spanner lever is pivotally connected with an arm 48 on one of the bearing brackets 7 and its bifurcated rear end partially embraces the hub of the plural disk gear 38 so that when said spanner lever is moved in one direction, the plural disk gear will be moved laterally against the resistance of the spring 43ª and out of mesh with the pinion 26.

The hand lever 32 is provided with a laterally projecting pin 49 to pass through any one of a series of holes 50, 51, 52 in an arm 53 secured to the main frame 1, to retain the gearing in the position to which it may be adjusted, and the hand lever is retained normally in such engagement with the arm 53 by means of a spring 54 attached at one end to the lever loop 43 and at the other end to the axle sleeve 3.

It will be seen that by moving the hand lever 32 laterally, motion will be imparted through the lever 43—31 and its connections with the plural gear to shift the latter and thus move it out of mesh with the pinion 26. When the hand lever 32 is thus moved laterally, it will become disengaged from the arm 53 and it may now be raised or lowered on its pivotal connection with arm 31 to move the pinion 26 on the shaft 24 and thus shift said pinion relatively to the gears of the plural disk gear for changing the speed of the feeding or dropping mechanism. After the pinion has thus been shifted, the pin 49 on the hand lever 32 will be permitted to enter one of the holes in the arm 53 and said lever and the shifting lever 31—43 will be moved by the spring 54 to permit the spring to force one of the gears of the plural disk gear into mesh with said pinion. Thus the speed of the feeding or dropping mechanism may be quickly changed according to varying conditions which may be met with during the operation of the planter, and the operator is compelled to move the plural gear completely out of mesh with the pinion before shifting the latter from one to another of the gears of the plural gear. It will also be seen that the gearing may be thrown out of mesh when desired, without shifting the pinion, by moving the hand lever 32 laterally and permitting the pin 49 to rest against the arm 53 between the holes in the latter.

In order to throw the gearing out of mesh when the soil engaging devices of the planter are raised by the operation of the hand lever 11, the instrumentalities now to be described are employed.

A sleeve 55 is mounted loosely on the shaft 8 and provided with a shoulder 56 to be engaged by a shoulder 57 on the hub of the segmental gear 10. The sleeve 55 is provided with a depending arm 58, with which one end of a rod 59 is connected. The other end of this rod is threaded and passes through a sleeve 60 pivoted to an arm 61 projecting laterally from the spanner or shifter lever 47. From this construction, it is apparent that when the lever 11 is moved downwardly to raise the soil engaging devices, the engagement of the shoulder 57 with the shoulder 56 will cause the sleeve 55 to turn and impart motion through the arm 58 and rod 59 to the shifter lever 47, and cause the plural gear to be moved out of mesh with the pinion 26, thus stopping the operation of the feeding or dropping mechanism.

Various changes might be made in the details of construction of our invention without departing from the spirit thereof or limiting its scope, and hence I do not wish to restrict myself to the precise details herein set forth.

Having fully described our invention, what we claim as new and desire to secure by Letters-Patent, is:—

1. The combination with variable speed gearing for operating feeding mechanism of a planter, said gearing comprising a plural shiftable gear and a shiftable pinion, of a lever pivoted between its ends, connections between said lever and the plural gear for moving the same away from the pinion, a hand lever pivoted to one arm of said first-mentioned lever and adapted to engage the other arm thereof, to turn said lever for shifting the plural gear, and connections between said hand lever and the pinion for shifting the latter relative to the plural gear when said hand lever is moved on its pivotal connection with said first-mentioned lever.

2. The combination with variable speed gearing for operating the feed mechanism of a planter, said gearing comprising a shiftable plural gear and a shiftable pinion, of a lever pivoted betwen its ends, connections between an arm of said lever and the plural gear for shifting the latter, a hand lever pivoted to one arm of said first-mentioned lever and adapted to engage the other arm thereof for turning the said first-mentioned lever when the hand lever is moved laterally, a fixed arm having a plurality of perforations, a pin on the hand lever to enter any one of said perforations, a pivoted shift lever for shifting the pinion relatively to the plural gear, and a connection between said shift lever and the hand lever for shifting the pinion when the hand lever is moved vertically.

3. The combination with framework, of variable speed gearing for operating the feed mechanism of a planter, said gearing comprising a shiftable plural gear and a shiftable pinion, a vertical shaft mounted in the framework, a lever mounted between its ends on said shaft, connections between said lever and the plural gear, a hand lever pivoted to one arm of said first-mentioned lever and adapted to engage the other arm thereof, means for locking said hand lever, a sleeve on said vertical shaft, a shift lever pivoted to said sleeve and connected with said pinion, and a connection between said shift lever and the hand lever.

4. The combination with framework, an axle, and an axle sleeve secured to the framework, of a sleeve secured to rotate with the axle and having a flange at one end, a plural gear having a hub mounted to rotate with said sleeve and to slide thereon, a pinion to mesh with said plural gear, a spring encircling said sleeve and bearing against the flange thereon and against the plural gear for pressing the latter toward the pinion, a hand lever, connections between the hand lever and plural gear for shifting the latter, and connections between the hand lever and pinion for shifting said pinion relatively to the plural gear.

5. The combination with framework, a shaft mounted on the framework, a hand lever for operating said shaft, and gearing including a shiftable plural gear and a shiftable pinion, of a sleeve mounted on said shaft, a part on said shaft to engage said sleeve for moving the same, a shift lever connected with the plural gear, connections between said shift lever and the sleeve on said shaft, a shifting lever, connections between the latter and said first-mentioned shift lever, and shifting means interposed between said shifting lever and said pinion.

6. The combination with framework and an axle, of a sleeve mounted to turn with the axle and to engage the framework and prevent endwise movement of the axle, said sleeve having a flange at one end, a gear having its hub mounted on the sleeve to turn therewith and slide thereon, a spring on said sleeve and interposed between the flange thereof and said gear, a pinion adapted to mesh with said gear, and means for moving said gear away from the pinion and against the resistance of said spring.

In testimony whereof I have signed this specification in the presence of two subscribing witnesses.

WILLIAM R. ROBERTS.

Witnesses:
EDWARD D. KIELY,
JAMES R. PATTON.

In testimony whereof I have signed this specification in the presence of two subscribing witnesses.

EDWARD M. HEYLMAN.

Witnesses:
EDWIN NICAR,
CHAS. A. WEBSTER.

Copies of this patent may be obtained for five cents each, by addressing the "Commissioner of Patents, Washington, D. C."